United States Patent
Eom et al.

(10) Patent No.: US 8,996,656 B2
(45) Date of Patent: Mar. 31, 2015

(54) FILE TRANSFER METHOD IN CONVERGED IP MESSAGING SYSTEM

(75) Inventors: Hyeonsang Eom, Seoul (KR); Jin Hyuck Kim, Seoul (KR); Byung Ho Min, Seoul (KR); Gun-wook Kim, Goyang-si (KR); So-young Jeong, Seoul (KR); Kyung Park, Daejeon-si (KR)

(73) Assignees: Pantech Co., Ltd., Seoul (KR); Seoul National University Industry Foundation, Seoul (KR)

( * ) Notice: Subject to any disclaimer, the term of this patent is extended or adjusted under 35 U.S.C. 154(b) by 774 days.

(21) Appl. No.: 12/043,363

(22) Filed: Mar. 6, 2008

(65) Prior Publication Data

US 2008/0219283 A1 Sep. 11, 2008

(30) Foreign Application Priority Data

Mar. 6, 2007 (KR) ........................ 10-2007-0021934

(51) Int. Cl.
- *G06F 15/16* (2006.01)
- *H04L 29/08* (2006.01)
- *H04L 12/58* (2006.01)

(52) U.S. Cl.
CPC ............... *H04L 67/06* (2013.01); *H04L 12/589* (2013.01); *H04L 51/36* (2013.01)
USPC ........... 709/218; 709/202; 709/206; 709/207; 709/236; 709/237; 370/432; 725/62

(58) Field of Classification Search
CPC ........ H04L 67/06; H04L 12/589; H04L 51/36
USPC .......... 709/202, 203, 206, 207, 218, 236–237
See application file for complete search history.

(56) References Cited

U.S. PATENT DOCUMENTS

| | | | | |
|---|---|---|---|---|
| 6,957,268 | B1 * | 10/2005 | Odom et al. ................. | 709/232 |
| 8,060,621 | B2 * | 11/2011 | Lee et al. ..................... | 709/206 |
| 2004/0117839 | A1 * | 6/2004 | Watson et al. ................ | 725/87 |
| 2006/0253873 | A1 * | 11/2006 | Lim et al. .................... | 725/62 |
| 2007/0005711 | A1 * | 1/2007 | Hassounah et al. ........... | 709/206 |
| 2008/0028044 | A1 * | 1/2008 | Powers et al. ................ | 709/219 |
| 2008/0040503 | A1 * | 2/2008 | Kleks et al. .................. | 709/236 |

FOREIGN PATENT DOCUMENTS

KR  10-0392879  9/2000

* cited by examiner

*Primary Examiner* — Patrice Winder
*Assistant Examiner* — Nam Tran
(74) *Attorney, Agent, or Firm* — H.C. Park & Associates, PLC

(57) ABSTRACT

A method for performing a one-to-many file transfer in a converged IP messaging system includes receiving a list of target receiving terminals from a transmitting terminal; verifying whether the transmitting terminal can transfer a file; inquiring each receiving terminal server corresponding to each target receiving terminal whether to receive the file; verifying whether each target receiving terminal can receive the file; inquiring each target receiving terminal whether to receive the file; transmitting to the transmitting terminal server the reply of receiving terminals to receive the file; creating a list of determined receiving terminals; requesting the transmitting terminal to transfer the file; receiving the file from the transmitting terminal; and transferring the file to each receiving terminal server corresponding to the determined receiving terminals or to each determined receiving terminal.

22 Claims, 6 Drawing Sheets

FILE TRANSFER METHOD IN CONVERGED IP MESSAGING SYSTEM

CROSS REFERENCE TO RELATED APPLICATION

This application claims priority from and the benefit of Korean Patent Application No. 10-2007-0021934, filed on Mar. 6, 2007, which is hereby incorporated by reference for all purposes as if fully set forth herein.

BACKGROUND OF THE INVENTION

1. Field of the Invention

The present invention relates to a file transfer method in a converged Internet Protocol (IP) messaging system and, more particularly, to a one-to-many file transfer method that may improve file transfer performance, security, and reliability.

2. Discussion of the Background

FIG. 1 is a schematic diagram of a converged IP messaging system 10. The converged IP messaging system 10, which has been studied by the Open Mobile Alliance (OMA), a standardization organization for mobile application software, provides such services as messaging services and file transfer services. The converged IP messaging system 10 includes a transmitting terminal server 11 in communication with a transmitting terminal 20 and a receiving terminal server 12 in communication with a receiving terminal 30.

FIG. 2 is a flow chart of a file transfer method used by a traditional converged IP messaging system. For the transmitting terminal 20 to transfer a file to the receiving terminal 30, the transmitting terminal 20 first requests the transmitting terminal server 11 to establish a connection for file transfer in operation S110. The transmitting terminal server 11 verifies whether the transmitting terminal 20 can make a file transfer in operation S120.

If the transmitting terminal 20 is able to make a file transfer, the transmitting terminal server 11 inquires from the receiving terminal server 12 whether to receive a file in operation S130. The receiving terminal server 12 verifies whether the receiving terminal 30 can receive the file in operation S140. If the receiving terminal 30 is able to receive the file, the receiving terminal server 120 inquires from the receiving terminal 30 whether to receive the file in operation S150.

If the receiving terminal 30 replies to receive the file in operation S160, the receiving terminal server 12 sends the reply to receive the file to the transmitting terminal server 11 in operation S170. If the transmitting terminal server 11 sends the reply to the transmitting terminal 20 in operation S180, the transmitting terminal 20 receives the reply and transfers the file directly to the receiving terminal 30 in operation S190. Thus, according to the traditional file transfer method, the file is transferred directly from the transmitting terminal 20 to the receiving terminal 30 in the converged IP messaging system 10.

In the converged IP messaging system 10 using the traditional file transfer method, the transmitting terminal 20 is responsible for the connection for file transfer and the management of the connection. Therefore, in a one-to-many file transfer, where the transmitting terminal 20 is transmitting a file to more than one receiving terminal 30, the transmitting terminal 20 may experience a heavy resource load since it establishes a connection for file transfer to each receiving terminal 30 and transfers the same file to each receiving terminal 30.

Additionally, in the converged IP messaging system 10 using the traditional file transfer method, after the connection between the transmitting terminal 20 and the receiving terminal 30 is established, the transmitting terminal 20 transfers the file directly to the receiving terminal 30 without passing through the converged IP messaging system 10, which may result in unstable wireless sectors and limited wireless resources. Accordingly, it may create a heavy packet loss, thus lowering file transfer performance and reliability.

Furthermore, in the converged IP messaging system using the traditional file transfer method, if the transmitting terminal 20 transfers a malicious file, the receiving terminal 30 may only rely on file extension filtering as an IP-based instant messaging program.

SUMMARY OF THE INVENTION

This invention provides a one-to-many file transfer method of a converged IP messaging system.

Additional aspects of the invention will be set forth in the description which follows, and in part will be apparent from the description, or may be learned by practice of the invention.

The present invention discloses a method for transmitting a file from a transmitting terminal to a first receiving terminal in a converged Internet Protocol (IP) messaging system including a transmitting terminal server and a first receiving terminal server. The method includes receiving a list of target receiving terminals from the transmitting terminal, the target receiving terminals including the first receiving terminal, verifying whether the transmitting terminal can transfer the file, inquiring the first receiving terminal server corresponding to the first receiving terminal about whether to receive the file, verifying whether the first receiving terminal is able to receive the file, inquiring the first receiving terminal about whether to receive the file if the first receiving terminal is able to receive the file, transmitting to the transmitting terminal server a first reply to receive the file from the first receiving terminal, creating a list of determined receiving terminals, the determined receiving terminals including the first receiving terminal, requesting, by the transmitting terminal server, the transmitting terminal to transfer the file, receiving, by the transmitting terminal server, the file from the transmitting terminal, and transferring, by the transmitting terminal server, the file to the first receiving terminal.

The present invention also discloses a method for transmitting a file from a transmitting terminal to a first receiving terminal in a converged Internet Protocol (IP) messaging system including a transmitting terminal server and a first receiving terminal server. The method includes receiving a list of target receiving terminals from the transmitting terminal, the target receiving terminals including the first receiving terminal, verifying whether the transmitting terminal can transfer the file, inquiring the first receiving terminal server corresponding to the first receiving terminal about whether to receive the file, verifying whether the first receiving terminal is able to receive the file, inquiring the first receiving terminal about whether to receive the file if the first receiving terminal is able to receive the file, transmitting to the transmitting terminal server a first reply to receive the file from the first receiving terminal, creating a list of determined receiving terminals, the determined receiving terminals including the first receiving terminal, requesting, by the transmitting terminal server, the transmitting terminal to transfer the file, receiving, by the transmitting terminal server, the file from the transmitting terminal, setting, by the transmitting terminal server, an authority to access the file, notifying, by the transmitting terminal server, the first receiving terminal that it is allowed to receive the file, and determining, by the transmitting terminal server, whether the first receiving terminal has authority to access the file, and transferring the file to the first receiving terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF THE ILLUSTRATED EMBODIMENTS

Figure 1:
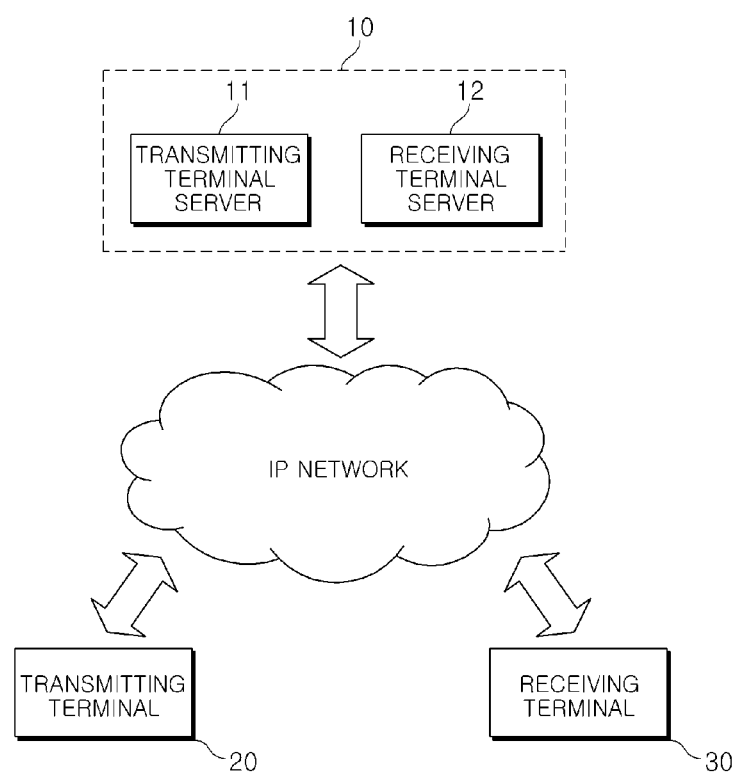
FIG. 1 is schematic diagram of a converged IP messaging system.
Figure 2:
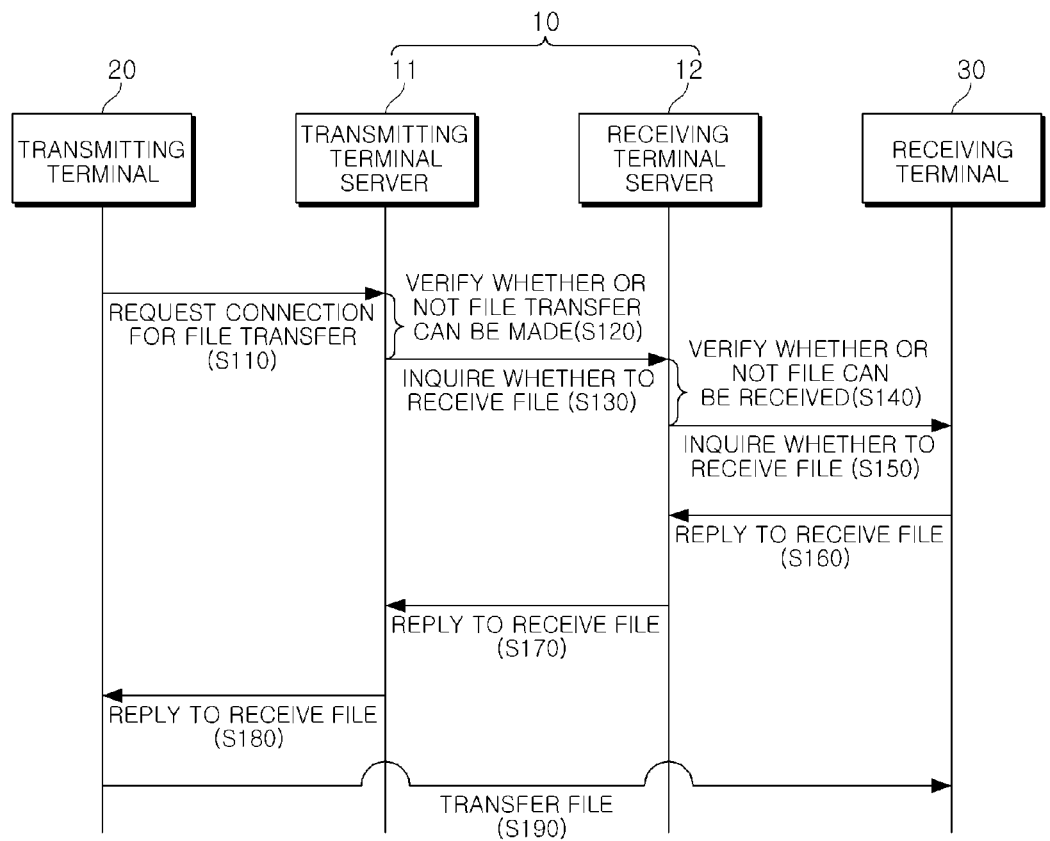
FIG. 2 is a flow chart of a traditional file transfer method for use in a converged IP messaging system.

The invention is described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 3:
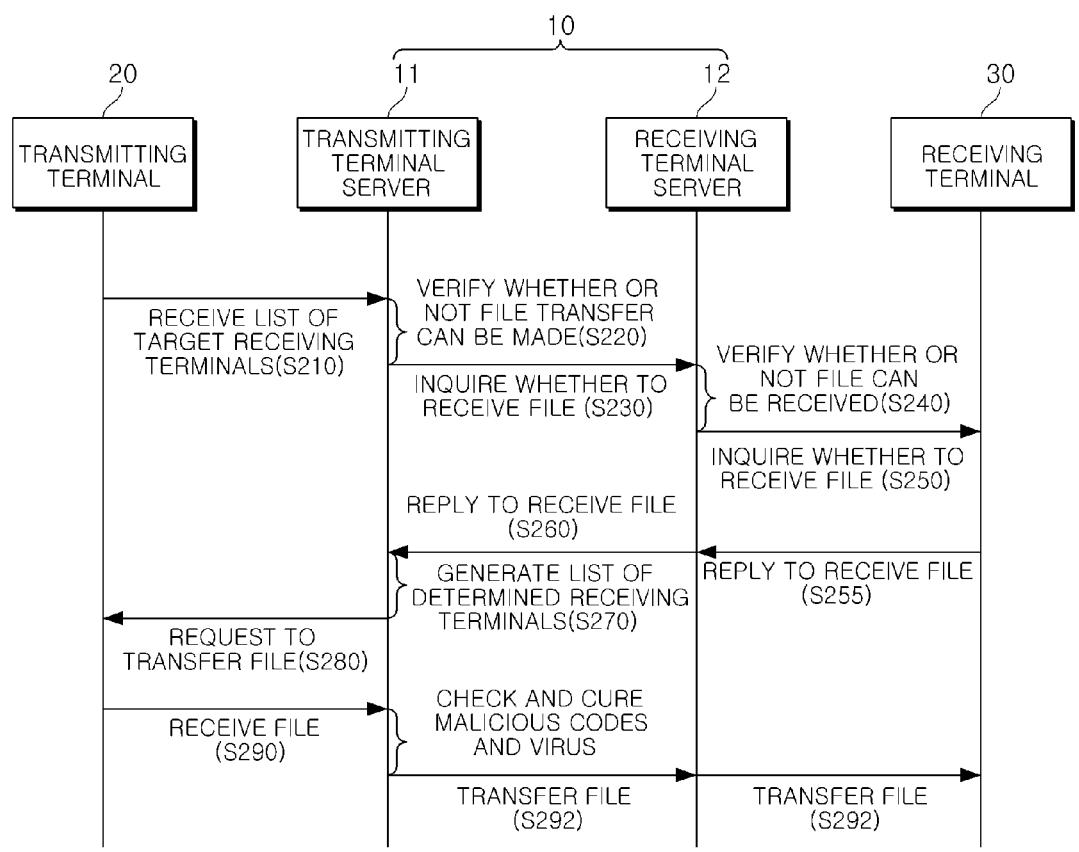
FIG. 3 is a flow chart of a one-to-many file transfer method for use in a converged IP messaging system according to a first exemplary embodiment of the present invention.

FIG. 3 is a flow chart of a one-to-many file transfer method for use in a converged IP messaging system according to a first exemplary embodiment of the present invention. The one-to-many file transfer method used by a converged IP messaging system 10 will be described.

To begin the method for transferring a file from a transmitting terminal 20 to many receiving terminals 30, the transmitting terminal 20 may send a list of target receiving terminals 30 to a transmitting terminal server 11. The transmitting terminal server 11 receives the list from the transmitting terminal 20 in operation S210.

Then, the transmitting terminal sever 11 verifies whether the transmitting terminal 20 can transfer the file in operation S220. The transmitting terminal server 11 may verify this from wireless resources of the transmitting terminal 20 and/or network conditions.

If the transmitting terminal 20 is able to transfer the file, in operation S230, the transmitting terminal server 11 inquires from each receiving terminal server 12 corresponding to each receiving terminal 30 listed on the list about whether to receive the file.

Each receiving terminal server 12 verifies whether each corresponding receiving terminal 30 can receive the file in operation S240. The receiving terminal server 12 may verify this from wireless resources of the receiving terminal 30 and/or network conditions.

For each receiving terminal 30 that is able to receive the file, in operation S250, each corresponding receiving terminal server 12 inquires from each receiving terminal 30 about whether to receive the file. Each receiving terminal 30 may reply to receive or not to receive the file in operation S255.

For each receiving terminal 30 that replies to receive the file, each corresponding receiving terminal server 12 sends the reply to receive to the transmitting terminal server 11 in operation S260.

In operation S270, the transmitting terminal server 11 creates a list of determined receiving terminals 30 that have replied to receive the file. The list of determined receiving terminals 30 is a list of receiving terminals 30 that are able to receive the file among receiving terminals 30 listed on the list of target receiving terminals 30 and that have replied to receive the file. In another exemplary embodiment, the transmitting terminal server 11 may wait a predetermined time to generate the list of determined receiving terminals 30 even if not all replies are received, and may exclude receiving terminals 30 from which replies have not been received from the list.

After creating the list in operation S270, the transmitting terminal server 11 requests the transmitting terminal 20 to transfer the file in operation S280, and receives the file from the transmitting terminal 20 in operation S290.

After receiving the file in operation S290, the transmitting terminal server 11 transfers the file to each receiving terminal server 12 corresponding to each receiving terminal 30 listed on the list of determined receiving terminals 30 in operation S292. Each receiving terminal server 12 transfers the file to each corresponding receiving terminal 30 on the list of determined receiving terminals 30. Accordingly, a one-to-many file transfer from a single transmitting terminal 20 to a plurality of receiving terminals 30 is made in a converged IP messaging system 10 under authority of the transmitting terminal server 11. Additionally, it will be noted that the method may be performed as a one-to-one file transfer method within the scope of the exemplary embodiment if, for example, only one receiving terminal 30 replies to receive the file in operation S255 or only one receiving terminal 30 is able to receive the file in operation S240.

Therefore, according to the present exemplary embodiment, it may be possible to improve file transfer performance and reliability in a converged IP messaging system 10 by managing file transfer and transferring a file under the authority of a transmitting terminal server 11.

In another exemplary embodiment, the transmitting terminal server 11 may scan the transferred file for a virus or malicious code after receiving the file in operation S290 and, if the file is not infected, the file is transferred in operation S292.

If a virus or malicious code is detected in the file during the scan after operation S290, operation S292 may be performed only after the virus or malicious code is treated by, for example, repair or deletion. If the virus or malicious code cannot be treated, the transmitting terminal server 11 may not transfer the file. A detailed description of methods for performing the virus or malicious code scan and treatment is omitted herein.

Therefore, if the file to be transferred by the transmitting terminal 20 is infected with a virus or malicious code, the transmitting terminal server 11 handles the file infected with virus or malicious code to protect the receiving terminals 30 from the virus or malicious code. Accordingly, it may be possible to increase the reliability and safety of the file transfer.

Figure 4:
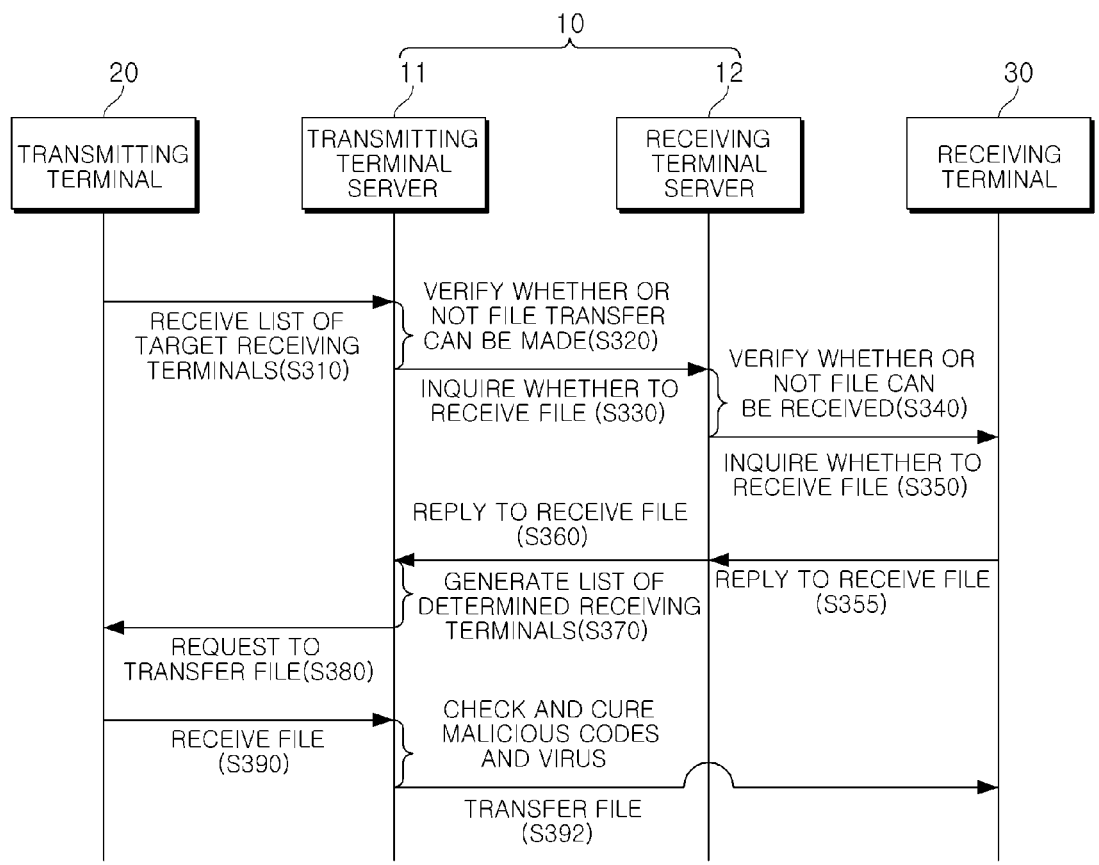
FIG. 4 is a flow chart of a one-to-many file transfer method for use in a converged IP messaging system according to a second exemplary embodiment of the present invention.

FIG. 4 is a flow chart of a one-to-many file transfer method for use in a converged IP messaging system according to a second exemplary embodiment of the present invention. Unlike the above-mentioned first embodiment, the one-to-many file transfer method of a converged IP messaging system according to the second exemplary embodiment transfers a file from a transmitting terminal server 11 directly to a receiving terminal 30 without passing through a receiving terminal server 12. The second exemplary embodiment will be described in detail.

To begin the method for transferring a file from a transmitting terminal 20 to many receiving terminals 30, the transmitting terminal 20 may send a list of target receiving terminals 30 to a transmitting terminal server 11. The transmitting terminal server 11 receives the list from the transmitting terminal 20 in operation S310.

Then the transmitting terminal server 11 verifies whether the transmitting terminal 20 can transfer the file in operation S320. The transmitting terminal server 11 may verify this from wireless resources of the transmitting terminal 20 and/or network conditions.

If the transmitting terminal 20 is able to transfer the file, in operation S330, the transmitting terminal server 11 inquires from each receiving terminal server 12 corresponding to each receiving terminal 30 listed on the list about whether to receive the file.

Each receiving terminal server 12 verifies whether each corresponding receiving terminal 30 can receive the file in operation S340. The receiving terminal server 12 may verify from wireless resources of the receiving terminal 30 and/or network conditions.

For each receiving terminal 30 that is able receive the file, in operation S350, each corresponding receiving terminal server 12 inquires from each receiving terminal 30 about whether to receive the file. Each receiving terminal 30 makes a reply to receive or not to receive the file in operation S355.

Each receiving terminal server 12 corresponding to each receiving terminal 30 having made a reply to receive sends the reply to receive to the transmitting terminal server 11 in operation S360.

In operation S370, the transmitting terminal server 11 creates a list of determined receiving terminals 30 that have replied to receive the file. The list of determined receiving terminals 30 is a list of receiving terminals 30 that are able to receive the file among receiving terminals 30 listed on the list of target receiving terminals 30 and that have replied to receive the file. In another exemplary embodiment, the transmitting terminal server 11 may wait a predetermined time to generate the list of determined receiving terminals 30 even if not all replies are received, and may exclude receiving terminals 30 from which replies have not been received from the list.

After creating the list in operation S370, the transmitting terminal server 11 requests a corresponding transmitting terminal 20 to transfer the file in operation S380, and receives the file from the transmitting terminal 20 in operation S390.

After receiving the file in operation S390, the transmitting terminal server 11 transfers the file to each receiving terminal 30 listed on the list of determined receiving terminals 30 in operation S392. Accordingly, one-to-many file transfer from a single transmitting terminal 20 to a plurality of receiving terminals 30 is made in a converged IP messaging system 10 under authority of the transmitting terminal server 11. Additionally, it will be noted that the method may be performed as a one-to-one file transfer method within the scope of the exemplary embodiment if, for example, only one receiving terminal 30 replies to receive the file in operation S355 or only one receiving terminal 30 is able to receive the file in operation S340.

Therefore, according to the present exemplary embodiment, file transfer performance and reliability may be improved in a converged IP messaging system 10 by managing file transfer and transferring a file under authority of a transmitting terminal server 11.

In another exemplary embodiment, the transmitting terminal server 11 may scan the transferred file for a virus or malicious code after receiving the file in operation S390 and, if the file is not infected, the file may be transferred to the receiving terminals 30 in operation S392. If the file is infected with a virus or malicious code, the transmitting terminal server 11 may take such steps as described above with respect to the first exemplary embodiment.

Figure 5:
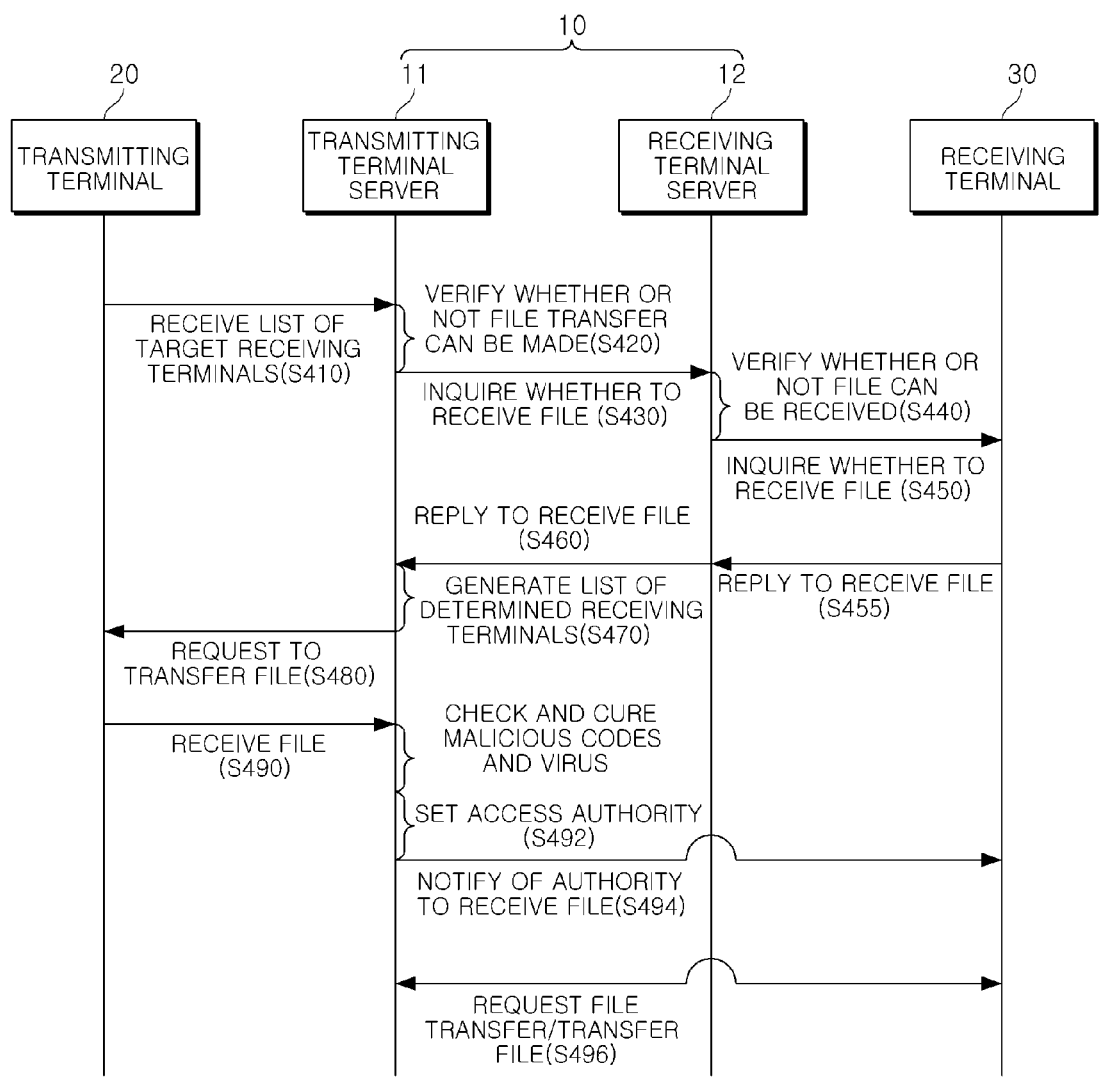
FIG. 5 is a flow chart of a one-to-many file transfer method for use in a converged IP messaging system according to a third exemplary embodiment of the present invention.

FIG. 5 is a flow chart of a one-to-many file transfer method for use in a converged IP messaging system according to a third exemplary embodiment of the invention. Unlike the above-mentioned first and second exemplary embodiments, the converged IP messaging system according to the third exemplary embodiment requests and receives a file that is access-limited and stored in a transmitting terminal server 11. The third exemplary embodiment will be described in more detail below.

To begin the method for transferring a file from a transmitting terminal 20 to many receiving terminals 30, the transmitting terminal 20 may send a list of target receiving terminals 30 to a transmitting terminal server 11. The transmitting terminal server 11 receives the list from the transmitting terminal 20 in operation S410.

Then the transmitting terminal server 11 verifies whether the transmitting terminal 20 can transfer the file in operation S420. The transmitting terminal server 11 may verify this from wireless resources of the transmitting terminal 20 and/or network conditions.

If the transmitting terminal 20 is able to transfer the file, in operation S430, the transmitting terminal server 11 inquires from each receiving terminal server 12 corresponding to each receiving terminal 30 listed on the list about whether to receive the file.

Each receiving terminal server 12 verifies whether each corresponding receiving terminal 30 can receive the file in operation S440. The receiving terminal server 12 may verify this from wireless resources of the receiving terminal 30 and/or network conditions.

For each receiving terminal 30 that is able to receive the file, in operation S450, each corresponding receiving terminal server 12 inquires from each receiving terminal 30 about whether to receive the file. Each receiving terminal 30 may reply to receive or not to receive the file in operation S455.

Each receiving terminal server 12 corresponding to each receiving terminal 30 having made a reply to receive sends the reply to receive to the transmitting terminal server 11 in operation S460.

In operation S470, the transmitting terminal server 11 creates a list of determined receiving terminals 30 that have replied to receive the file. The list of determined receiving terminals 30 is a list of receiving terminals 30 that are able to receive the file among receiving terminals 30 listed on the list of target receiving terminals 30 and that have replied to receive the file. In another exemplary embodiment, the transmitting terminal server 11 may wait a predetermined time to generate the list of determined receiving terminals 30 even if not all replies are received, and may exclude receiving terminals 30 from which replies have not been received from the list.

After creating the list in operation S470, the transmitting terminal server 11 requests the transmitting terminal 20 to transfer the file in operation S480, and receives the file from the transmitting terminal 20 in operation S490.

After receiving the file in operation S490, the transmitting terminal server 11 sets an authority to access the file in operation S492. The authority is granted only to receiving terminals 30 listed on the list of determined receiving terminals 30. A detailed description of methods for setting an authority to access a file is omitted herein.

After setting the authority in operation S492, the transmitting terminal server 11 notifies each receiving terminal 30 listed on the list of determined receiving terminals 30 that it has been granted an authority to access the file in operation S494.

After the notification, upon request of a determined receiving terminal 30, the transmitting terminal server 11 determines whether the determined receiving terminal 30 has the authority to access the file, and transfers the file to the determined receiving terminal 30 in operation S496. Accordingly, a one-to-many file transfer from a single transmitting terminal 20 to a plurality of receiving terminals 30 is made in a converged IP messaging system 10 under authority of the transmitting terminal server 11. Additionally, it will be noted that the method may be performed as a one-to-one file transfer method within the scope of the exemplary embodiment if, for example, only one receiving terminal 30 replies to receive the file in operation S455, only one receiving terminal 30 is able to receive the file in operation S440, or if only one file transfer request is received in operation S496.

Therefore, according to the present exemplary embodiment, it may be possible to improve file transfer performance and reliability in a converged IP messaging system 10 by managing file transfer and transferring a file under authority of a transmitting terminal server 11.

In another exemplary embodiment, the transmitting terminal server 11 may scan the transferred file for a virus or malicious code after receiving the file in operation S490 and, if the file is not infected, the file is transferred in operation S496. If the file is infected with a virus or malicious code, the transmitting terminal server 11 may take such steps as described above with respect to the first exemplary embodiment.

Figure 6:
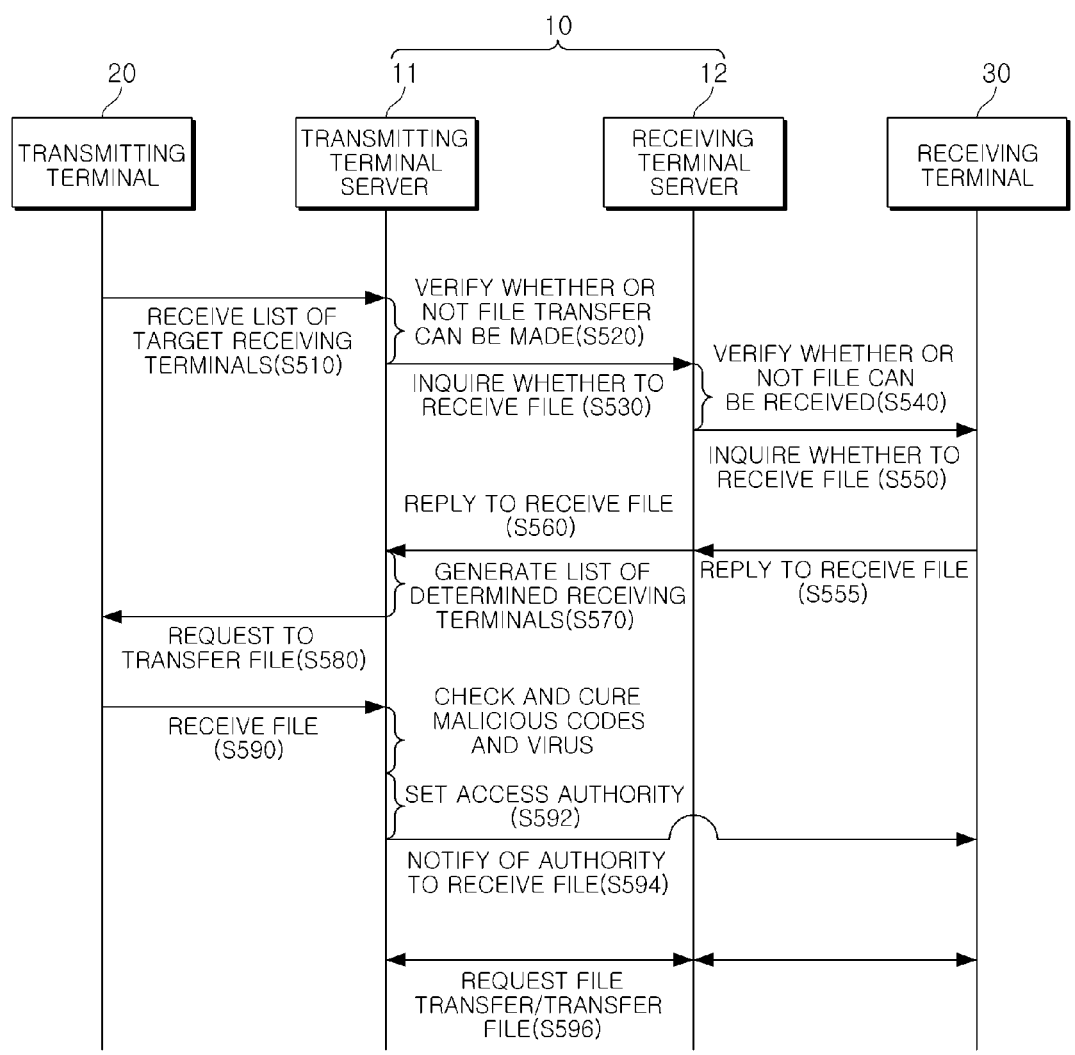
FIG. 6 is a flow chart of a one-to-many file transfer method for use in a converged IP messaging system according to a fourth exemplary embodiment of the present invention.

FIG. 6 is a flow chart of a one-to-many file transfer method for use in a converged IP messaging system according to a fourth exemplary embodiment of the invention. Unlike the above-mentioned third exemplary embodiment, the fourth exemplary embodiment is configured such that a receiving terminal 30 receives a file from a transmitting terminal server 11 via a receiving terminal server 12. The fourth exemplary embodiment will be described in detail.

To begin the method for transferring a file from a transmitting terminal 20 to many receiving terminals 30, the transmitting terminal 20 may send a list of target receiving terminals 30 to a transmitting terminal server 11. The transmitting terminal server 11 receives the list from the transmitting terminal 20 in operation S510.

Then, the transmitting terminal server 11 verifies whether the transmitting terminal 20 can transfer the file in operation S520. The transmitting terminal server 11 may verify this from wireless resources of the transmitting terminal 20 and/or network conditions.

If the transmitting terminal 20 is able to transfer the file, in operation S530, the transmitting terminal server 11 inquires from each receiving terminal server 12 corresponding to each receiving terminal 30 listed on the list about whether to receive the file.

Each receiving terminal server 12 verifies whether each corresponding receiving terminal 30 can receive the file in operation S540. The receiving terminal server 12 may verify this from wireless resources of the receiving terminal 30 and/or network conditions.

For each receiving terminal 30 that is able to receive the file, in operation S550, each corresponding receiving terminal server 12 inquires from each receiving terminal 30 about whether to receive the file. Each receiving terminal 30 may reply to receive or not to receive the file in operation S555.

Each receiving terminal server 12 corresponding to each receiving terminal 30 having made a reply to receive sends the reply to receive to the transmitting terminal server 11 in operation S560.

In operation S570, the transmitting terminal server 11 creates a list of determined receiving terminals 30 that have replied to receive the file. The list of determined receiving terminals 30 is a list of receiving terminals 30 that are able to receive the file among receiving terminals 30 listed on the list of target receiving terminals 30 and that have replied to receive the file. In another exemplary embodiment, the transmitting terminal server 11 may wait a predetermined time to generate the list of determined receiving terminals 30 even if not all replies are received, and may exclude receiving terminals 30 from which replies have not been received from the list.

After creating the list in operation S570, the transmitting terminal server 11 requests the transmitting terminal 20 to transfer the file in operation S580, and receives the file from the transmitting terminal 20 in operation S590.

After receiving the file in operation S590, the transmitting terminal server 11 sets an authority to access the file in operation S592. The authority is granted only to receiving terminals 30 listed on the list of determined receiving terminals 30. A detailed description of methods for setting an authority to access a file is omitted herein.

After setting the authority in operation S592, the transmitting terminal server 11 notifies each receiving terminal 30 listed on the list of determined receiving terminals 30 that it has been granted an authority to access the file in operation S594.

After the notification, upon request of a determined receiving terminal 30, a corresponding receiving terminal server 12 requests the transmitting terminal server 11 to transfer the file. The transmitting terminal server 11 determines whether the determined receiving terminal 30 has the authority to access the file, and in operation S596, transfers the file to the receiving terminal server 12 corresponding to each determined receiving terminal 30 having the authority to access the file. Each receiving terminal server 12 transfers the file to one or more corresponding determined receiving terminals 30 having authority to access the file. Accordingly, a one-to-many file transfer from a single transmitting terminal 20 to a plurality of receiving terminals 30 via one or more receiving terminal servers 12 is made in a converged IP messaging system 10 under authority of the transmitting terminal server 11. Additionally, it will be noted that the method may be performed as a one-to-one file transfer method within the scope of the exemplary embodiment if, for example, only one receiving terminal 30 replies to receive the file in operation S555, only one receiving terminal 30 is able to receive the file in operation S540, or if only one file transfer request is received in operation S596.

Therefore, according to the present exemplary embodiment, it may be possible to improve file transfer performance and reliability in a converged IP messaging system 10 by managing file transfer and transferring a file under authority of a transmitting terminal server 11.

In another exemplary embodiment, the transmitting terminal server 11 may scan the transferred file for a virus or malicious code after receiving the file in operation S590 and, if the file is not infected, the file is transferred in operation S5962. If the file is infected with a virus, the transmitting terminal server 11 may take such steps as described above with respect to the first exemplary embodiment.

As is apparent from the above description, according to the exemplary embodiments of present invention, file transfer performance and reliability in a converged IP messaging system may be improved by managing file transfer and transferring a file under authority of a transmitting terminal server.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for transmitting a file from a transmitting terminal to a receiving terminals in a converged Internet Protocol (IP) messaging system comprising a transmitting terminal server and one or more receiving terminal servers, the method comprising:
receiving a provisional list of target receiving terminals from the transmitting terminal, the target receiving terminals comprising a first receiving terminal and a second receiving terminal;
verifying whether the transmitting terminal can transfer the file;
inquiring each receiving terminal server corresponding to the target receiving terminals about whether to receive the file;
verifying whether each of the target receiving terminals is able to receive the file according to wireless resources of each target receiving terminal or network conditions;
inquiring the first receiving terminal about whether to receive the file if the first receiving terminal is able to receive the file, and inquiring the second receiving terminal about whether to receive the file if the second receiving terminal is able to receive the file;
receiving a first reply to receive the file from the first receiving terminal through a first receiving terminal server corresponding to the first receiving terminal;
creating a determined list of determined receiving terminals based on the first reply and the provisional list, the determined receiving terminals comprising the first receiving terminal;
requesting, by the transmitting terminal server, the transmitting terminal to transfer the file to the transmitting terminal server if it is verified that the first receiving terminal is able to receive the file;
receiving, by the transmitting terminal server, the file from the transmitting terminal; and
transferring, by the transmitting terminal server, the file to the first receiving terminal.

2. The method of claim 1, wherein transferring comprises transferring the file from the transmitting terminal server to the first receiving terminal server, and transferring the file from the first receiving terminal server to the first receiving terminal.

3. The method of claim 1, further comprising:
inquiring a second receiving terminal server of the converged Internet Protocol (IP) messaging system about whether to receive the file, the second receiving terminal server corresponding to the second receiving terminal;
receiving a second reply to receive the file from the second receiving terminal through the second receiving terminal server; and
transferring, by the transmitting terminal server, the file to the second receiving terminal,
wherein the determined receiving terminals further comprise the second receiving terminal, and
wherein the determined list of determined receiving terminals is created based further on the second reply.

4. The method of claim 3, wherein transferring, by the transmitting terminal server, the file to the second receiving terminal comprises transferring the file from the transmitting terminal server to the second receiving terminal server, and transferring the file from the second receiving terminal server to the second receiving terminal.

5. The method of claim 1, further comprising checking, by the transmitting terminal server, whether the file is infected with a malicious code or a virus.

6. The method of claim 5, further comprising treating the file if the file is infected with the malicious code or the virus.

7. The method of claim 6, wherein treating the file comprises deleting or repairing the malicious code or the virus.

8. The method of claim 1, further comprising:
inquiring a third receiving terminal about whether to receive the file if the third receiving terminal is able to receive the file; and
excluding the third receiving terminal from the determined list if a third reply from the third receiving terminal is not received within a determined period of time,
wherein the target receiving terminals in the provisional list comprise the third receiving terminal.

9. The method of claim 8, further comprising calculating a preset time for determining the determined list,
wherein the determined list is created if the preset time is passed from a reference time.

10. A method for transmitting a file from a transmitting terminal to receiving terminals in a converged Internet Protocol (IP) messaging system comprising a transmitting terminal server and one or more receiving terminal servers, the method comprising:
receiving a provisional list of target receiving terminals from the transmitting terminal, the target receiving terminals comprising a first receiving terminal and a second receiving terminal;
verifying whether the transmitting terminal can transfer the file;
inquiring each receiving terminal server corresponding to the target receiving terminals about whether to receive the file;
verifying whether each of the target receiving terminals is able to receive the file according to wireless resources of each target receiving terminal or network conditions;
inquiring the first receiving terminal about whether to receive the file if the first receiving terminal is able to receive the file, and inquiring the second receiving terminal about whether to receive the file if the second receiving terminal is able to receive the file;
transmitting, by a first receiving terminal server corresponding to the first receiving terminal, to the transmitting terminal server a first reply to receive the file from the first receiving terminal;

creating a determined list of determined receiving terminals based on the first reply and the provisional list, the determined receiving terminals comprising the first receiving terminal;

requesting, by the transmitting terminal server, the transmitting terminal to transfer the file to the transmitting terminal server if it is verified that the first receiving terminal is able to receive the file;

receiving, by the transmitting terminal server, the file from the transmitting terminal;

setting, by the transmitting terminal server, an authority to access the file based on the determined list;

notifying, by the transmitting terminal server, the first receiving terminal that it is allowed to receive the file; and determining, by the transmitting terminal server, whether the first receiving terminal has authority to access the file, and transferring the file to the first receiving terminal.

11. The method of claim 10, wherein the step of determining is performed upon request of the first receiving terminal to receive the file.

12. The method of claim 10, wherein the step of determining is performed upon request of the first receiving terminal server.

13. The method of claim 10, wherein the step of transferring further comprises:
transferring the file from the transmitting terminal server to the first receiving terminal server; and
transferring the file from the first receiving terminal server to the first receiving terminal.

14. The method of claim 10, further comprising:
inquiring a second receiving terminal server of the converged Internet Protocol (IP) messaging system about whether to receive the file, the second receiving terminal server corresponding to the second receiving terminal;
transmitting, by the second receiving terminal server, to the transmitting terminal server a second reply to receive the file from the second receiving terminal; and
notifying, by the transmitting terminal server, the second receiving terminal that it is allowed to receive the file; and
determining, by the transmitting terminal server, whether the second receiving terminal has authority to access the file, and transferring the file to the second receiving terminal,
wherein the determined receiving terminals further comprise the second receiving terminal, and
wherein the determined list of determined receiving terminals is created based further on the second reply.

15. The method of claim 14, wherein the step of determining, by the transmitting terminal server, whether the second receiving terminal has authority to access the file is performed upon request of the second receiving terminal to receive the file.

16. The method of claim 14, wherein the step of determining, by the transmitting terminal server, whether the second receiving terminal has authority to access the file is performed upon request of the second receiving terminal server.

17. The method of claim 14, wherein the step of transferring the file to the second receiving terminal further comprises:
transferring the file from the transmitting terminal server to the second receiving terminal server; and
transferring the file from the second receiving terminal server to the second receiving terminal.

18. The method of claim 10, further comprising checking, by the transmitting terminal server, whether the file is infected with a malicious code or a virus.

19. The method of claim 18, further comprising treating the file if the file is infected with the malicious code or the virus.

20. The method of claim 19, wherein treating the file comprises deleting or repairing the malicious code or the virus.

21. The method of claim 10, further comprising:
inquiring a third receiving terminal server of the converged Internet Protocol (IP) messaging system about whether to receive the file, the third receiving terminal server corresponding to a third receiving terminal;
inquiring the third receiving terminal about whether to receive the file if the third receiving terminal is able to receive the file, and inquiring a fourth receiving terminal about whether to receive the file if the fourth receiving terminal is able to receive the file, the fourth receiving terminal corresponding to the first receiving terminal server; and
excluding the third receiving terminal from the determined list if a third reply from the third receiving terminal is not received within a determined period of time, and excluding the fourth receiving terminal from the determined list if a fourth reply from the fourth receiving terminal is not received within a determined period of time,
wherein the target receiving terminals in the provisional list comprise the third receiving terminal and the fourth receiving terminal.

22. A method for transmitting a file from a transmitting terminal to receiving terminals in a converged Internet Protocol (IP) messaging system comprising a transmitting terminal server and one or more receiving terminal servers, the method comprising:
receiving a provisional list of target receiving terminals from the transmitting terminal, the target receiving terminals comprising a first receiving terminal and a second receiving terminal;
verifying whether the transmitting terminal can transfer the file;
inquiring each receiving terminal server corresponding to the target receiving terminals about whether to receive the file;
verifying whether each of the target receiving terminals is able to receive the file;
inquiring the first receiving terminal about whether to receive the file if the first receiving terminal is able to receive the file, and inquiring the second receiving terminal about whether to receive the file if the second receiving terminal is able to receive the file;
receiving a first reply to receive the file from the first receiving terminal through a corresponding receiving terminal server;
creating a determined list of determined receiving terminals based on the first reply and the provisional list, the determined receiving terminals comprising the first receiving terminal;
requesting, by the transmitting terminal server, the transmitting terminal to transfer the file;
receiving, by the transmitting terminal server, the file from the transmitting terminal;
setting, by the transmitting terminal server, an authority to access the file based on the determined list;
notifying, by the transmitting terminal server, the first receiving terminal that it is allowed to receive the file; and determining, by the transmitting terminal server, whether the first receiving terminal has authority to access the file, and transferring the file to the first receiving terminal.

* * * * *